United States Patent [19]

Pike

[11] 3,723,528
[45] Mar. 27, 1973

[54] PROSTAGLANDIN OXIMES AND OXIME ETHERS
[75] Inventor: John E. Pike, Kalamazoo, Mich.
[73] Assignee: The Upjohn Company, Kalamazoo, Mich.
[22] Filed: Aug. 20, 1971
[21] Appl. No.: 173,660

Related U.S. Application Data

[62] Division of Ser. No. 673,979, Oct. 9, 1967, Pat. No. 3,636,120.

[52] U.S. Cl..........................260/566 A, 260/566 AE
[51] Int. Cl.............................................C07c 131/02
[58] Field of Search.....................260/566 A, 566 AE

[56] References Cited

UNITED STATES PATENTS 3,504,020  3/1970  Lapidus et al.........................260/514

Primary Examiner—Leon Zitver
Assistant Examiner—Gerald A. Schwartz
Attorney—Morris L. Nielsen et al.

[57] ABSTRACT

This invention is a class of new organic compounds having the formula

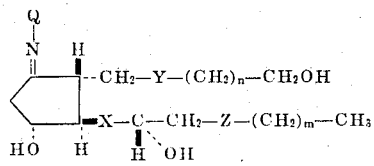

wherein Q is —OH, —OR$_2$ wherein R$_2$ is alkyl of one to four carbon atoms, inclusive, or —NHCOHN$_2$, wherein X is —CH$_2$CH$_2$— or trans—CH=CH— and both Y and Z are —CH$_2$CH$_2$—, or wherein X is trans——CH=CH—, Y is cis—CH=CH—, and Z is —CH$_2$CH$_2$— or cis—CH=CH—, wherein $m$ is 0, 1, or 2, and wherein $n$ is 2, 3, 4, or 5. These compounds are useful intermediates for the preparation of the corresponding ketones having pharmacological activity e.g., nasal decongestants.

7 Claims, No Drawings

PROSTAGLANDIN OXIMES AND OXIME ETHERS

CROSS-REFERENCE TO RELATED APPLICATION

This application is a division of U.S. Ser. No. 673,979 filed on Oct. 9, 1967 now U.S. Pat. No. 3,636,120.

DESCRIPTION OF THE INVENTION

This invention relates to novel compositions of matter, in particular novel compounds of the formula:

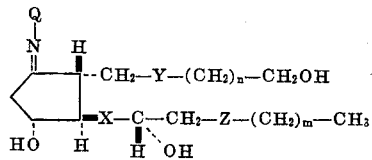

wherein Q is —OH, —OR$_2$ wherein R$_2$ is alkyl of one to four carbon atoms, inclusive, or —NHCONH$_2$, wherein X is —CH$_2$CH$_2$— or trans—CH=CH— and both Y and Z are —CH$_2$CH$_2$—, or wherein X is trans—CH=CH—, Y is cis—CH=CH—, and Z is —CH$_2$CH$_2$— or cis—CH=CH—, wherein m is 0, 1, or 2, and wherein n is 2, 3, 4, or 5. These compounds are useful for preparing compounds of the formula

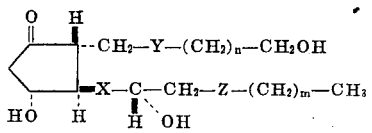

wherein X, Y, Z, m, and n are as defined above.

The formula I compounds are potent antagonists of epinephrine-induced mobilization of free fatty acids; are highly active in inhibiting blood platelet aggregation and thrombus formation induced by various biochemical stimuli, including collagen, ADP, and thrombin, and in causing thrombi to disaggregate, both in vitro and in vivo; are surprisingly and unexpectedly free of side effects such as blood pressure lowering and smooth muscle stimulation exhibited by other known lipid mobilization inhibitors and platelet aggregation inhibitors, as see, for example, Emmons et al., British Medical Journal, 2, 468 (1967); and are useful in mammals, as nasal decongestants. For the latter purpose, the compounds are used in a dose range about 10 μg to about 10 mg. per ml. of a pharmacologically suitable liquid vehicle or as an aerosol spray, both for topical application.

For the above purposes, the formula I compounds can be used in the trihydroxy form or in the form of the corresponding tricarboxyacylates, preferably in the form of the tri-lower-alkanoate.

The formula I compounds are produced by the following sequence of reactions:

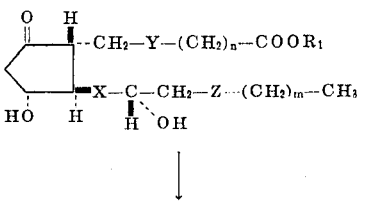

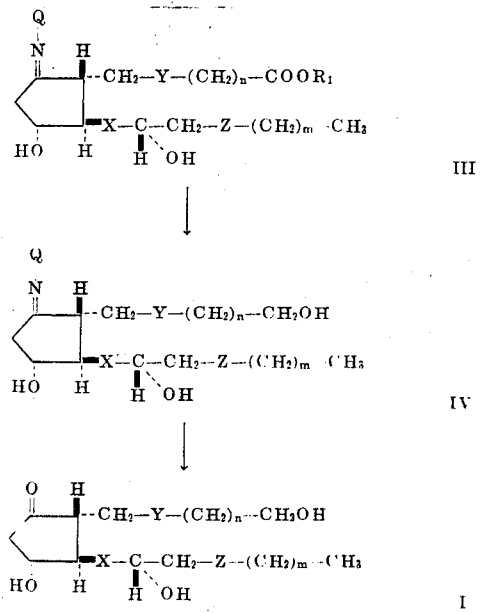

In the above reaction scheme, X, Y, Z, m, and n are as defined above. R$_1$ is hydrogen or alkyl of one to eight carbon atoms, inclusive. Q is defined as any group of atoms transformable together with the attached nitrogen to carbonyl oxygen by reaction with nitrous acid.

The initial reactants of formula II are known in the art or can be prepared by methods known in the art. In formula II, when R$_1$ is hydrogen, m is 1, and n is 3, the carbon skeleton of prostanoic acid is described. See Horton, Experientia, 21, 113 (1965) and Samuelsson, Angew. Chem. Inter. Ed. Eng. 4, 410 (1965). When R$_1$ is hydrogen, m is 1, n is 3, and X, Y, and Z are each —CH$_2$CH$_2$—, formula II describes dihydroprostaglandin E$_1$ (dihydro-PGE$_1$). Similarly, with the same limitations on R$_1$, m, and n, and the other permissible variations in X, Y, and Z, formula II describes the other known prostaglandin E compounds, PGE$_1$, PGE$_2$, and PGE$_3$. For a discussion of the stereochemistry of these compounds which also applies to the other compounds encompassed by formulas I, III, and IV, see Nature, 212, 38 (1966) and footnote (3) in J. Am. Chem. Soc. 88, 3,133 (1966).

The compounds within the scope of formula II wherein R$_1$ is hydrogen and m and n are other than the above-mentioned combination of 1 and 3, respectively, are prepared by incubation of the appropriate unsaturated carboxylic acid with the enzymes of sheep seminal vesicular glands as described in U.S. Pat. No. 3,296,091.

The compounds within the scope of formula II wherein R$_1$ is alkyl of one to eight carbon atoms, inclusive, are prepared by esterification of the corresponding free acid, i.e., R$_1$ is hydrogen, with the appropriate diazoalkane. See, for example, U.S. Pat. No. 3,069,322 and British specification No. 1,040,544.

The transformation of the initial reactants of formula II to the final desired primary alcohols of formula I proceeds through two novel intermediates, compounds of formulas III and IV. It will be observed that the overall transformation of II to I involves transformation of the —COOR$_1$ moiety of the initial formula II reactant to the —CH$_2$OH moiety of the final formula I product. The remainder of the molecule of formula II reactant, including its stereochemical configuration, remains unchanged in the formula I product.

Several known reagents are available for the transformation of a —COOH or —COOalkyl moiety to a —$CH_2OH$ moiety. Examples are lithium aluminum hydride, lithium borohydride, and diisobutyl aluminum hydride. However, those reagents also will usually reduce an isolated carbonyl group to a secondary alcohol group. Such a carbonyl group is present in the cyclopentane ring of the formula II reactant. Therefore that group must be protected with a group of atoms unreactive with the above-mentioned carboxylate reducing agents. Of equal importance is that the protective atom grouping must be such that it can be transformed back to the carbonyl group after the carboxylate reduction without alteration of the rest of the molecule.

It is well known that reactants of formula II are extraordinarily sensitive to acidic and basic conditions, being easily transformed thereby to other compounds. It was quite surprising and unexpected therefore that nitrous acid, especially in the absence of strong acids, for example, the mineral acids, has no substantial chemical effect on reactants of formula II. In view of that discovery, the isolated carbonyl group of the formula II reactant is advantageously protected with a group of atoms which can be transformed back to the carbonyl group by reaction with nitrous acid after the carboxylate reduction.

Reagents which will transform an isolated carbonyl group to another group transformable back to the carbonyl group by reaction with nitrous acid are well known to those skilled in this art. Examples are hydroxylamine, alkoxyamines of the formula $R_2ONH_2$ wherein $R_2$ is alkyl of one to four carbon atoms, inclusive, semicarbazide, and thiosemicarbazide. Thereby, oximes, alkoxyoximes, semicarbazones, and thiosemicarbazones are formed.

The transformations of initial reactant II to first intermediate III, and of first intermediate III to second intermediate IV are carried out by methods known in the art for protecting isolated carbonyl groups and for reducing carboxyl groups or carbalkoxy groups. The transformation of second intermediate IV to final product II is carried out by mixing intermediate IV with nitrous acid in the range about $-10°$ C. to about $50°$ C., preferably about $10°$ C. to about $35°$ C. The nitrous acid is advantageously generated in the presence of the formula IV intermediate by dissolving or suspending the latter in a liquid alkanoic acid, e.g., acetic or propionic acid, preferably in the presence of a small amount of water, i.e., about 5 to about 25 percent water, and then adding an aqueous solution of an alkali metal or alkaline earth metal nitrite. At least one equivalent of the nitrite per equivalent of intermediate IV should be used, and it is usually advantageous to use about 2 to about 20 times the theoretical amount of nitrite. The resulting reaction mixture is maintained within the specified temperature range until thin layer chromatography of an aliquot shows intermediate IV has disappeared. The desired formula I product is then isolated from the extract by methods known in the art. One useful procedure is dilution of the reaction mixture with water, and then extraction with a water-immiscible solvent, e.g., ethyl acetate. Evaporation of the extract then gives the desired product which can advantageously be purified by methods known to be useful for purification of the prostaglandins, especially preparative thin layer chromatography. See, for example, Green et al., J. Lipid Research, 5, 117 (1964).

Carboxyacylation of the three hydroxy groups in the novel formula I compounds of this invention is accomplished by interaction of the hydroxy compound with a carboxyacylating agent, preferably a carboxylic acid anhydride, for example, the anhydrides of alkanoic, cycloalkanoic, alkenoic, cycloalkenoic, aralkanoic, aromatic, and heterocyclic carboxylic acids. For example, use of acetic anhydride gives the corresponding triacetate. Similar use of propionic anhydride, butyric anhydride, isobutyric anhydride, acrylic anhydride, crotonic anhydride, cyclohexanecarboxylic anhydride, benzoic anhydride, naphthoic anhydride, p-chlorophenoxyacetic anhydride, and furoic anhydride gives the corresponding tricarboxyacylates.

The carboxyacylation is advantageously carried out by mixing the hydroxy compound and the acid anhydride preferably in the presence of a tertiary amine such as pyridine or triethylamine. A substantial excess of the anhydride should be used, preferably about 10 to about 10,000 moles of anhydride per mole of the hydroxy compound reactant. The excess anhydride serves as a reaction diluent and solvent. An inert organic diluent, for example, dioxane, can be added. It is preferred to use enough of the tertiary amine to neutralize the carboxylic acid produced by the reaction.

The carboxyacylation reaction is preferably carried out in the range about $0°$ to about $100°$ C. The necessary reaction time will depend on such factors as the reaction temperature and the nature of the anhydride and tertiary amine reactants. With acetic anhydride, pyridine, and a $25°$ C. reaction temperature, a 12 to 24-hour reaction time should be used.

The carboxyacylated product is isolated from the reaction mixture by conventional methods. For example, the excess anhydride can be decomposed with water, and the resulting mixture acidified and then extracted with a solvent such as diethyl ether. The desired carboxyacylate will usually be extracted by the ether and is recoverable therefrom by evaporation. If desired, the carboxyacylate can be purified by conventional methods, preferably by chromatography.

The invention can be more fully understood by the following examples.

Example 1 Oxime of 7-[3α-hydroxy-2β-(3α-hydroxy-trans-1-octenyl)-5-oxo-1α-cyclopentyl]heptanoic acid ($PGE_1$).

A solution of 0.2 g. of hydroxylamine hydrochloride and 0.25 g. of sodium acetate in 4 ml. of 1:1 aqueous methanol was added to a solution of 0.2 g. of $PGE_1$ in 2 ml. of methanol, and the mixture was allowed to stand at $25°$ C. for 18 hrs. At the end of this time, the methanol was removed at room temperature under a nitrogen stream. The residual mixture was diluted with water. The crystalline solid which formed was collected by filtration, washed with water, and then dried in vacuo to give 0.19 g. of solid. That solid was recrystallized from aqueous methanol to give 0.15 g. of the oxime of $PGE_1$; m.p. $122°-124°$ C. On TLC, the oxime was less polar than $PGE_1$ with solvent system A IX (5:5:70 acetic acid:methanol:chloroform).

Analysis:
    Calcd. for $C_{20}H_{35}O_5N$:
        C, 65.01; H, 9.55; N, 3.79.
    Found: C, 64.87; H, 9.68; N, 3.74.
    I.R. (Principal bands; Nujol mull) 3,420, 3,340, 3,080, 3,030, 2,750, 2,680, 2,560, 1,715, 1,665, 1,255, 1,240, 1,230, 1,065 and 945 $cm^{-1}$.

Following the procedure of Example 1, the oximes of each of the following compounds were prepared:
1. dihydro-$PGE_1$,
2. $PGE_2$,
3. $PGE_3$,
4. 6-[3α-hydroxy-2β-(3α-hydroxy-trans-1-octenyl)-5-oxo-1α-cyclopentyl]hexanoic acid,
5. 6-[3α-hydroxy-2β-(3α-hydroxy-trans-1-octenyl)-5-oxo-1α-cyclopentyl]-cis-4-hexenoic acid,
6. 8-[3α-hydroxy-2β-(3α-hydroxy-trans-1-octenyl)-5-oxoα-cyclopentyl]-cis-6-octenoic acid,
7. 6-[3α-hydroxy-2β-(3α-hydroxy-trans-1-heptenyl)-5-oxo-1α-cyclopentyl]hexanoic acid.

Following the procedure of Example 1 but substituting for hydroxylamine hydrochloride, a stoichiometrically equivalent amount of methoxyamine hydrochloride, semicarbazide hydrochloride, or thiosemicarbazide hydrochloride, $PGE_1$ methoxime, $PGE_1$ semicarbazone, and $PGE_1$ thiosemicarbazone were prepared. Similarly, substituting for $PGE_1$ the prostaglandins and analogs thereof named following Example 1, and substituting for hydroxylamine hydrochloride the stoichiometrically equivalent amount of methoxyamine hydrochloride, semicarbazide hydrochloride, or thiosemicarbazide hydrochloride, following the procedure of Example 1, the corresponding derivative of the named prostaglandins and analogs thereof were prepared.

Example 2 Oxime of methyl 7-[3α-hydroxy-2β-(3α-hydroxyoctyl)-5-oxo-1α-cyclopentyl]heptanoate (dihydro-$PGE_1$ methyl ester).

A mixture of 25 mg. of dihydro-$PGE_1$ methyl ester, 1 ml. of methanol, 25 mg. of hydroxylamine hydrochloride, 30 mg. of sodium acetate and 0.5 ml. of water was allowed to stand about 18 hrs. at 25° C. The reaction mixture was concentrated at 25° C. under a stream of nitrogen. An oil separated in the residual mixture, and was extracted with dichloromethane. The dichloromethane extract was washed with water, dried, and evaporated to give an oily residue. That residue was dissolved in a small amount of a mixture of 50 percent ethyl acetate and 50 percent cyclohexane, and the solution was chromatographed on 15 g. of silica gel. Elution with a mixture of 75 percent ethyl acetate and 25 percent cyclohexane and evaporation of the eluate gave 24 mg. of the oxime of dihydro-$PGE_1$ methyl ester. On TLC analysis (silica gel; ethyl acetate), one spot was obtained; slightly more polar than dihydro-$PGE_1$ methyl ester with the same solvent system.

I.R. (Principal bands, dichloromethane solution): 3,300, 1,745 and 930 $cm^{-1}$.

Example 3 Oxime of methyl 7-[3α-hydroxy-2β-(3α-hydroxy-trans-1-octenyl)-5-oxo-1α-cyclopentyl]-cis-5-heptenoate oxime ($PGE_2$ methyl ester).

A solution of 25 mg. of $PGE_2$ methyl ester in 1 ml. of methanol was mixed with a solution of 25 mg. of hydroxylamine hydrochloride and 30 mg. of sodium acetate in 0.5 ml. of water. The mixture was allowed to stand at 25° C. for about 18 hrs. Then, the mixture was concentrated by evaporation under a stream of nitrogen to remove the methanol. The residue was diluted with water and extracted with dichloromethane. The extract was washed with water, dried over magnesium sulfate, and evaporated to give a residue. That residue was purified by chromatography over 15 g. of silica gel, eluting first with a mixture of 50 percent ethyl acetate and 50 percent cyclohexane, and next with a mixture of 75 percent ethyl acetate and 25 percent cyclohexane. The eluate fractions were evaporated to give the oxime of $PGE_2$ methyl ester.

Following the procedure of Example 3, oximes of the following were prepared:
1. methyl 7-[3α-hydroxy-2β-(3α-hydroxy-trans-1-cis-5-octadienyl)-5-oxo-1α-cyclopentyl]-cis-5-heptenoate ($PGE_3$ methyl ester),
2. methyl 6-[3α-hydroxy-2β-(3α-hydroxy-trans-1-octenyl)-5-oxo-1α-cyclopentyl]hexanoate,
3. methyl 6-[3α-hydroxy-2β-(3α-hydroxy-trans-1-octenyl)-5-oxo-1α-cyclopentyl]-cis-4-hexenoate,
4. methyl 8-[3α-hydroxy-2β-(3α-hydroxy-trans-1-octenyl)-5-oxo-1α-cyclopentyl]-cis-6-octenoate,
5. ethyl 6-[3α-hydroxy-2β-(3α-hydroxy-trans-1-heptenyl)-5-oxo-1α-cyclopentyl]hexanoate.

Example 4 Methoxime of methyl 7-[3α-hydroxy-2β-(3α-hydroxyoctyl)-5-oxo-1α-cyclopentyl]heptanoate (dihydro-$PGE_1$ methyl ester).

A mixture of 25 mg. of dihydro-$PGE_1$ methyl ester, 25 mg. of methoxyamine hydrochloride and 1 ml. of pyridine was allowed to stand 18 hrs. at 25° C. under nitrogen. The resulting mixture was poured into about 20 ml. of water, and then extracted with dichloromethane. The extract was washed with water, dried over sodium sulfate, and evaporated under reduced pressure to give a residue, which was chromatographed on silica gel as described in Example 2 to give the methoxime of dihydro-$PGE_1$ methyl ester.

Following the procedure of Example 4, methoximes of the following were prepared:
1. $PGE_1$ methyl ester,
2. $PGE_2$ methyl ester,
3. $PGE_3$ methyl ester,
4. methyl 6-[3α-hydroxy-2β-(3α-hydroxy-trans-1-octenyl)-5-oxo-1α-cyclopentyl]hexanoate,
5. methyl 6-[3α-hydroxy-2β-(3α-hydroxy-trans-1-octenyl)-5-oxo-1α-cyclopentyl]-cis-4-hexenoate,
6. methyl 8-[3α-hydroxy-2β-(3α-hydroxy-trans-1-octenyl)-5-oxo-1α-cyclopentyl]-cis-6-octenoate,
7. ethyl 6-[3α-hydroxy-2β-hydroxy-trans-1-heptenyl)-5-oxo-1α-cyclopentyl]hexanoate.

Example 5 Semicarbazone of methyl 7-[3α-hydroxy-2β-(3α-hydroxyoctyl)-5-oxo-1α-cyclopentyl]heptanoate (dihydro-$PGE_1$ methyl ester).

A solution of 25 mg. of dihydro-$PGE_1$ methyl ester in 1 ml. of methanol was mixed with a solution of 35 mg. of semicarbazide hydrochloride and 30 mg. of sodium acetate in 0.5 ml. of water. The mixture was allowed to stand at 25° C. for about 18 hrs. The resulting mixture was concentrated by evaporation under a stream of nitrogen to remove the methanol. The residue was diluted with water and extracted with dichloromethane. The extract was washed with water, dried over sodium sulfate, and evaporated to give a residue, which was chromatographed on silica gel as described in Example 2 to give the semicarbazone of dihydro-$PGE_1$ methyl ester.

Following the procedure of Example 5, semicarbazones of the following were prepared:
1. PGE$_1$ methyl ester,
2. PGE$_2$ methyl ester,
3. PGE$_3$ methyl ester,
4. methyl 6-[3α-hydroxy-2β-(3α-hydroxy-trans-1-octenyl)-5-oxo-1α-cyclopentyl]hexanoate,
5. methyl 6-[3α-hydroxy-2β-(3α-hydroxy-trans-1-octenyl)-5-oxo-1α-cyclopentyl]-cis-4-hexenoate,
6. methyl 8-[3α-hydroxy-2β-(3α-hydroxy-trans-1-octenyl)-5-oxo-1α-cyclopentyl]-cis-6-octenoate,
7. ethyl 6-[3α-hydroxy-2β-(3α-hydroxy-trans-1-heptenyl)-5-oxo-1α-cyclopentyl]hexanoate.

Following the procedure of Example 5 but substituting thiosemicarbazide hydrochloride for semicarbazide hydrochloride, thiosemicarbazones of the following were prepared:
1. dihydro-PGE$_1$ methyl ester,
2. PGE$_1$ methyl ester,
3. PGE$_2$ methyl ester,
4. PGE$_3$ methyl ester.

Example 6 Oxime of 4α-hydroxy-2α-(7-hydroxyheptyl)-3β-(3α-hydroxy-trans-1-octenyl)cyclopentanone.

A solution of 250 mg. of the oxime of PGE$_1$ in 17 ml. of dry tetrahydrofuran was added with stirring to a suspension of 1.2 g. of lithium aluminum hydride in 119 ml. of dry diethyl ether under nitrogen. The mixture was stirred for 2 hrs. at 25° C. Then, excess lithium aluminum hydride was decomposed by successive additions of 50 ml. of ethyl acetate and water. The resulting mixture was filtered and the organic layer was separated, washed with water, dried over sodium sulfate, and evaporated under reduced pressure to give a crystalline residue which was triturated with diethyl ether. The diethyl ether solution was evaporated to dryness, and the residue was crystallized from a mixture of ethyl acetate and a mixture of isomeric hexanes (Skellysolve β) to give 70 mg. of the oxime of 4α-hydroxy-2α-(7-hydroxyheptyl)-3β-(3α-hydroxy-trans-1-octenyl)-cyclopentanone; m.p. 118°–124° C.

Analysis:
Calcd. for C$_{20}$H$_{37}$O$_4$N:
C, 67.57; H, 10.49; N, 3.74.
Found: C, 66.83; H, 10.44; N, 3.40.
I.R. (Principal bands, Nujol mull) 3,280, 1,670, 1,125, 1,085, 1,050, 1,030, 1,000, 975, and 955 cm$^{-1}$.
TLC: More polar than the oxime of PGE$_1$ on the A IX solvent system.

Example 7 The oxime of 4α-hydroxy-2α-(7-hydroxyheptyl)-3β-(3α-hydroxyoctyl)cyclopentanone.

A solution of 250 mg. of the oxime of dihydro-PGE$_1$ methyl ester in 15 ml. of dry tetrahydrofuran was added with stirring to a suspension of 1.2 g. of lithium aluminum hydride in 120 ml. of dry diethyl ether under nitrogen. The mixture was stirred for about 2 hrs. at 25° C. Then, the excess lithium aluminum hydride was decomposed by additions of 50 ml. of ethyl acetate and then water. The resulting mixture was filtered and the organic layer was separated, washed with water, dried over sodium sulfate, and evaporated under reduced pressure to give the oxime of 4α-hydroxy-2α-(7-hydroxyheptyl)-3β-(3α-hydroxyoctyl)cyclopentanone. This product is further purified by chromatography over silica gel using mixtures of ethyl acetate and cyclohexane containing increasing amounts of ethyl acetate for elution.

Following the procedures of Examples 6 or 7 but substituting for the oxime of PGE$_1$ or the oxime of dihydro-PGE$_1$ methyl ester, the following:
1. dihydro-PGE$_1$, oxime;
2. PGE$_1$ methyl ester, oxime;
3. PGE$_2$ methyl ester, oxime; PGE$_2$, oxime;
4. PGE$_3$ methyl ester, oxime; PGE$_3$, oxime;
5. methyl 6-[3α-hydroxy-2β-(3α-hydroxy-trans-1-octenyl)-5-oxo-1α-cyclopentyl]hexanoate, oxime;
6-[3α-hydroxy-2β-(3α-hydroxy-trans-1-octenyl)-5-oxo-1α-cyclopentyl]hexanoic acid, oxime;
6. methyl 6-[3α-hydroxy-2β-(3α-hydroxy-trans-1octenyl)-5-oxo-1α-cyclopentyl]-cis-4-hexenoate, oxime;
6-[3α-hydroxy-2β-(3α-hydroxy-trans-1-octenyl)-5-oxo-1α-cyclopentyl]-cis-4hexenoic acid, oxime;
7. methyl 8-[3α-hydroxy-2β-(3α-hydroxy-trans-1-octenyl)-5-oxo-1α-cyclopentyl]-cis-6-ocenoate, oxime;
8-[3α-hydroxy-2β-(3α-hydroxy-trans-1-octenyl)-5-oxo-1α-cyclopentyl]-cis-6-octenoic acid, oxime;
8. ethyl 6-[3α-hydroxy-2β-(3α-hydroxy-trans-1-heptenyl)-5-oxo-1α-cyclopentyl]hexanoate, oxime;
6-[3α-hydroxy-2β-(3α-hydroxy-trans-1-heptenyl)-5-oxo-1α-cyclopentyl]hexanoic acid, oxime;

there were obtained:
1. 4α-hydroxy-2α-(7-hydroxyheptyl)-3β-(3α-hydroxyoctyl)-cyclopentanone, oxime;
2. 4α-hydroxy-2α-(7-hydroxyheptyl)-3β-(3α-hydroxy-trans-1-octenyl)cyclopentanone, oxime;
3. 4α-hydroxy-2α-(7-hydroxy-cis-2-heptenyl)-3β-(3α-hydroxy-trans-1-octenyl)cyclopentanone, oxime;
4. 4α-hydroxy-2α-(7-hydroxy-cis-2-heptenyl)-3β-(3α-hydroxy-trans-1-cis-5-octadienyl)cyclopentanone, oxime;
5. 4α-hydroxy-2α-(6-hydroxyhexyl)-3β-(3α-hydroxy-trans-1-octenyl)cyclopentanone, oxime;
6. 4α-hydroxy-2α-(6-hydroxy-cis-4-hexenyl)-3β-(3α-hydroxy-trans-1-octenyl)cyclopentanone, oxime;
7. 4α-hydroxy-2α-(8-hydroxy-cis-6-octenyl)-3β-(3α-hydroxy-trans-1-octenyl)cyclopentanone, oxime;
8. 4α-hydroxy-2α-(6-hydroxyhexyl)-3β-(3α-hydroxy-trans-1-heptenyl)cyclopentanone, oxime.

Following the procedure of Example 7 but substituting for the oxime of dihydro PGE$_1$ methyl ester, the methoximes, semicarbazones and thiosemicarbazones of
1. dihydro-PGE$_1$ methyl ester; dihydro PGE$_1$;
2. PGE$_1$ methyl ester; PGE$_1$;
3. PGE$_2$ methyl ester; PGE$_2$;
4. PGE$_3$ methyl ester; PGE$_3$;

there are obtained the corresponding methoximes, semicarbazones, and thiosemicarbazones having the carboxy or carbalkoxy group reduced to a primary alcohol group, i.e., 1. 4α-hydroxy-2α-(7-hydroxyheptyl)-3β-(3α-hydroxyoctyl)-cyclopentanone, methoxime;
4α-hydroxy-2α-(7-hydroxyheptyl)-3β-(3α-hydroxyoctyl)-cyclopentanone, semicarbazone; and 4α-hydroxy-2α-(7-hydroxyheptyl)-3β-(3α-hydroxyoctyl)-cyclopentanone, thiosemicarbazone;

2. 4α-hydroxy-2α-(7-hydroxyheptyl)-3β-(3α-hydroxy-trans-1-octenyl)cyclopentanone, methoxime;

4α-hydroxy-2α-(7-hydroxyheptyl)-3β-(3α-hydroxy-trans-1-octenyl)cyclopentanone, semicarbazone; and 4α-hydroxy-2α-(7-hydroxyheptyl)-3β-(3α-hydroxy-trans-1-octenyl)cyclopentanone, thiosemicarbazone;

3. 4α-hydroxy-2α-(7-hydroxy-cis-2-heptenyl)-3β-(3α-hydroxy-trans-1-octenyl)cyclopentanone, methoxime;

4α-hydroxy-2α-(7-hydroxy-cis-2-heptenyl)-3β-(3α-hydroxy-trans-1-octenyl)cyclopentanone, semicarbazone; and 4α-hydroxy-2α-(7-hydroxy-cis-2-heptenyl)-3β-(3α-hydroxy-trans-1-octenyl)cyclopentanone, thiosemicarbazone;

4. 4α-hydroxy-2α-(7-hydroxy-cis-2-heptenyl)-3β-(3α-hydroxy-trans-1-cis-5-octadienyl)cyclopentanone, methoxime;

4α-hydroxy-2α-(7-hydroxy-cis-2-heptenyl)-3β-(3α-hydroxy-trans-1-cis-5-octadienyl)cyclopentanone, semicarbazone; and 4α-hydroxy-2α-(7-hydroxy-cis-2-heptenyl)-3β-(3α-hydroxy-trans-1-cis-5-octadienyl)cyclopentanone, thiosemicarbazone.

Example 8 4α-Hydroxy-2α-(7-hydroxyheptyl)-3β-(3α-hydroxy-trans-1-octenyl)cyclopentanone.

A solution of 146 mg. of the oxime of 4α-hydroxy-2α-(7-hydroxyheptyl)-3β-(3α-hydroxy-trans-1-octenyl)cyclopentanone in 10 ml. of 90 percent aqueous acetic acid was cooled to 10° C., and 5 ml. of a 10 percent aqueous solution of sodium nitrite was added. The mixture was allowed to stand 1 hr. at 10° C. Then the mixture was allowed to warm to room temperature and treated with an additional 5 ml. of 10 percent aqueous sodium nitrite. The mixture was allowed to stand 30 min. at 25° C. Excess water was then added, and the mixture was extracted with ethyl acetate. The organic extracts were separated, combined, washed with aqueous sodium bicarbonate and then with water, and dried over sodium sulfate. Evaporation of the solvent gave 163 mg. of a residue comprising 4α-hydroxy-2α-(7-hydroxyheptyl)-3β-(3α-hydroxy-trans-1-octenyl)cyclopentanone. The residue was dissolved in 1:1 ethyl acetate:cyclohexane and chromatographed over a column of 20 g. of acid-washed silica gel made up in 1:1 ethyl acetate:cyclohexane. The column was eluted successively with 1:1 ethyl acetate:cyclohexane, ethyl acetate, 2 percent methanol in ethyl acetate, and 5 percent ethanol is ethyl acetate. Evaporation of the eluate gave 67 mg. of crystalline fractions. This material was recrystallized from ethyl acetate to give 4α-hydroxy-2α-(7-hydroxyheptyl)-3β-(3α-hydroxy-trans-1-octenyl)cyclopentanone; m.p. 106°–108° C.

Analysis:
Calcd. for $C_{20}H_{36}O_4$:
C, 70.54; H, 10.66.
Found: C, 70.35; H, 11.08.

I.R. (Principal bands, Nujol mull) 3,470, 3,360, 1,725, 1,160, 1,125, 1,080, 1,055, 1,020, 990, 975 and 970 cm$^{-1}$.

TLC: More polar than the parent oxime on the A IX solvent system.

Following the procedure of Example 8 but substituting for 4α-hydroxy-2α-(7-hydroxyheptyl)-3β-(3α-hydroxy-trans-1-octenyl)-cyclopentanone, oxime, the following:

1. 4α-hydroxy-2α-(7-hydroxyheptyl)-3β-(3α-hydroxyoctyl)-cyclopentanone, oxime;
2. 4α-hydroxy-2α-(7-hydroxy-cis-2-heptenyl)-3β-(3α-hydroxy-trans-1-octenyl)cyclopentanone, oxime;
3. 4α-hydroxy-2α-(7-hydroxy-cis-2-heptenyl)-3β-(3α-hydroxy-trans-1-cis-5-octadienyl)cyclopentanone, oxime;
4. 4α-hydroxy-2α-(6-hydroxyhexyl)-3β-(3α-hydroxy-trans-1-octenyl)cyclopentanone, oxime;
5. 4α-hydroxy-2α-(6-hydroxy-cis-4-hexenyl)-3β-(3α-hydroxy-trans-1-octenyl)cyclopentanone, oxime;
6. 4α-hydroxy-2α-(8-hydroxy-cis-6-octenyl)-3β-(3α-hydroxy-trans-1-octenyl)cyclopentanone, oxime;
7. 4α-hydroxy-2α-(6-hydroxyhexyl)-3β-(3α-hydroxy-trans-1-heptenyl)cyclopentanone, oxime;

there were obtained:

1. 4α-hydroxy-2α-(7-hydroxyheptyl)-3β-(3α-hydroxyoctyl)-cyclopentanone;
2. 4α-hydroxy-2α-(7-hydroxy-cis-2-heptenyl)-3β-(3α-hydroxy-trans-1-octenyl)cyclopentanone;
3. 4α-hydroxy-2α-(7-hydroxy-cis-2-heptenyl)-3β-(3α-hydroxy-trans-1-cis-5-octadientyl)cyclopentanone;
4. 4α-hydroxy-2α-(6-hydroxyhexyl)-3β-(3α-hydroxy-trans-1-octenyl)cyclopentanone;
5. 4α-hydroxy-2α-(6-hydroxy-cis-4hexenyl)-3β-(3α-hydroxy-trans-1-octenyl)cyclopentanone;
6. 4α-hydroxy-2α-(8-hydroxy-cis-6-octenyl)-3β-(3α-hydroxy-trans-1-octenyl)cyclopentanone;
7. 4α-hydroxy-2α-(6-hydroxyhexyl)-3β-(3α-hydroxy-trans-1-heptenyl)cyclopentanone.

The above products were also obtained by following the procedures of Example 8 but replacing the starting oximes with the corresponding methoximes, semicarbazones, and thiosemicarbazones.

I claim:
1. A compound of the formula:

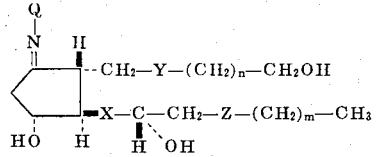

wherein Q is —OH, or —OR$_2$ wherein R$_2$ is alkyl of one to four carbon atoms, inclusive, wherein X is —CH$_2$CH$_2$— or trans—CH=CH— and both Y and Z are —CH$_2$CH$_2$—, or wherein X is trans—CH=CH—, Y is cis-CH=CH—, and Z is —CH$_2$CH$_2$— or cis—CH=CH—, wherein $m$ is 0, 1, or 2, and wherein $n$ is 2, 3, 4, or 5.

2. A compound according to claim 1 wherein $m$ is 1 and $n$ is 3.

3. A compound according to claim 2 wherein Q is —OH.

4. A compound according to claim 3 wherein X, Y, and Z are —CH$_2$CH$_2$—.

5. A compound according to claim 3 wherein X is trans—CH=CH—, and Y and Z are —CH$_2$CH$_2$—.

6. A compound according to claim 3 wherein X is trans—CH=CH, Y is cis—CH=CH—, and Z is —CH$_2$CH$_2$—.

7. A compound according to claim 3 wherein X is trans—CH=CH—, and Y and Z are cis—CH=CH—.

* * * * *

UNITED STATES PATENT OFFICE
CERTIFICATE OF CORRECTION

Patent No. 3,723,528          Dated March 27, 1973

Inventor(s) JOHN E. PIKE

It is certified that error appears in the above-identified patent and that said Letters Patent are hereby corrected as shown below:

In the Abstract, line 2 after the formula, "-NHCOHN$_2$" should read ---NHCONH$_2$--;

Column 5, line 19, "5-oxo$\alpha$-" should read --5-oxo-1$\alpha$---; Column 7, line 39, "(Skellysolve$\beta$) should read --(Skellysolve B)--; Column 8, line 20, "6-ocenoate" should read --6-octenoate--.

Signed and sealed this 20th day of November 1973.

(SEAL)
Attest:

EDWARD M. FLETCHER, JR.          RENE D. TEGTMEYER
Attesting Officer                 Acting Commissioner of Patents